United States Patent Office 3,753,991
Patented Aug. 21, 1973

3,753,991
PRODUCTION OF 2,3-DIHYDROXYQUINOLINE
Hans-Juergen Sturm, Gruenstadt, and Helmut Goerth, Ludwigshafen, Germany, assignors to Badische Anilin- & Soda-Fabrik Aktiengesellschaft, Ludwigshafen (Rhine), Germany
No Drawing. Original application May 19, 1969, Ser. No. 825,956, now Patent No. 3,682,928. Divided and this application Jan. 14, 1972, Ser. No. 217,947
Claims priority, application Germany, May 22, 1968, P 17 70 480.2
Int. Cl. C07d 33/38
U.S. Cl. 260—283 SY        3 Claims

ABSTRACT OF THE DISCLOSURE

Production of 2,4-dihydroxyquinoline starting from N-acetoacetylanthranilic acid esters.

---

This application is a division of U.S. application Ser. No. 825,956 filed on May 19, 1969 now U.S. Pat. 3,682,928.

This invention relates to a process for the production of 2,4-hydroxyquinoline.

We have found that 2,4-dihydroxyquinoline can be prepared in a very advantageous way by converting a N-acetoacetylanthranilic acid ester having the General Formula I:

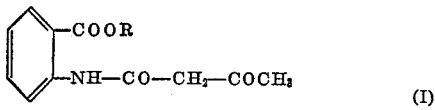

where R denotes an alkyl radical having from one to four carbon atoms, by means of aqueous alkali or alkaline earth into the alkali metal or alkaline earth metal salt of 2-acetyl-2,4-dihydroxyquinoline or by means of additional acidification into 3-acetyl-2,4-dihydroxyquinoline having the Formula II:

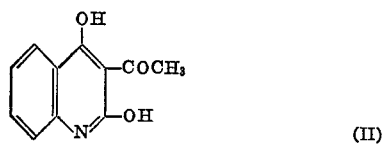

and deacetylating this product to 2,4-dihydroxyquinoline.

Examples of the radical R are methyl, ethyl, n-propyl, isopropyl, n-butyl or isobutyl, methyl and ethyl being preferred.

Compounds having the General Formula I are accessible easily and in excellent yields form the corresponding anthranilic esters by reaction with diketene.

Examples of alkalis or alkaline earths are: sodium hydroxide, potassium hydroxide, calcium hydroxide and barium hydroxide, sodium hydroxide being preferred.

Ring closure to form the compounds having the Formula II takes place in aqueous alkali which contains for examples from 1 to 10 equivalent, preferably from 1.5 to 6 equivalents, of alkali metal hydroxide or alkaline earth metal hydroxide per mole of the compound having the Formula I. The alkali metal salt or alkaline earth metal salt of 3-acetyl-2,4-dihydroxyquinoline is first formed in the reaction and this may be converted into 3-acetyl-2,4-dihydroxyquinoline by acidification.

Deacetylation to 2,4-dihydroquinoline is carried out in alkaline solution.

Sodium hydroxide, potassium hydroxide or calcium hydroxide may be used for example for deacetylation in alkaline solution, the deacetylation temperature being above 100° C., preferably above 140° C. When using aqueous alkaline solutions it is therefore necessary to use pressure resistant vessels. The use of pressure vessels may be avoided however by wholly or partly replacing water by a solvent or higher boiling point, such as alcohols, glycols or glycol ethers. Examples are diethylene glycol, triethylene glycol, methyl diglycol or ethyl diglycol.

A convenient method for the production of 2,4-dihydroxyquinoline consists in introducing the N-acetoacetylanthranilic ester into water at room or higher temperature (for example 80° C.) and then running in caustic alkali solution. The whole is stirred for half an hour to two hours at from 70° to 100° C.

Deacetylation is then carried out by raising the reaction temperature to 130° to 190° C., preferably from 150° to 170° C., and keeping reaction mixture at this temperature for from two to ten, preferably four to eight, hours. For ring closure and deacetylation it is advantageous to use from 2 to 10, preferably 4 to 6, equivalents of alkali metal hydroxide or alkaline earth metal hydroxide per mole of the compound having the Formula I, added all at once at the beginning of the reaction or preferably in several portions. The concentration of the alkaline solutions should preferably be from 1.5 to 5 N. Deacetylation in alkaline solution makes it possible, starting from compounds having the Formula I, to carry out the production of 2,4-dihydroxyquinoline in a single vessel, and the product can be isolated as the alkali metal or alkaline earth metal salt.

Cyclization of ethyl acetoacetylanthranilate to 3-acetyl-2,4-dihydroxyquinoline by heating in alcoholic caustic potash solution (K. Ogura, H. Sazaki, S. Seto, Bl. chem. Soc. Japan, 38, 306 (1965)) and of the methyl ester by boiling with sodium in toluene or by heating for several hours with sodium methylate in methanol and ether (R. Lacey, J. Chem. Soc., London, 1954, 850) is known. It is very surprising that the ring closure can also be achieved in dilute aqueous caustic alkali solution, and indeed under conditions which are normally chosen for hydrolyzing esters.

As compared with conventional industrial method for the production of 2,4-dihydroxyquinoline in which N-acetylanthranilic acid is cyclized in an anhydrous melt of sodium hydroxide and potassium hydroxide which contains a considerable amount of sodamide at temperatures of from 150 °to 180° C. (see BIOS 1153, 323), the new process offers great advantages. In the prior methods the melt has to be very carefully dehydrated prior to the actual reaction and similarly the N-acetylanthranilic acid has to be absolutely dry because sodamide reacts explosively with moisture. Moreover the melt has a strong corrosive effect. In contrast, the new process is more economical and less complicated, and it does not require any special safety precautions whatever in carrying it out.

It is very surprising that in deacetylation in alkaline solution in the absence of solubilizers, the reaction will only proceed when caustic alkaline solutions are used which are not too concentrated; for example caustic alkali solutions having a content of more than 50% of alkali are inactive.

The invention is illustrated by the following examples. Parts and percentages specified in the following examples relate to weight.

EXAMPLE 1

470 parts of methyl acetoacetylanthranilate and 800 parts of 50 % caustic soda solution are added to 3500 parts of water at about 80° C. in a stirred pressure vessel. The whole is stirred for half an hour at 90° C. to 100° C., then heated to 160° C., stirred for six hours at this temperature, cooled, the reaction mixture diluted somewhat with water and acidified. The precipitate is suction filtered, washed until neutral and dried. 290 parts of 96% 2,4-dihydroxyquinoline is obtained.

EXAMPLE 2

The procedure of Example 1 is followed but only 3000 parts of water is used. After the reaction is over the product is not diluted and acidified but the sodium salt of dihydroxyquinoline is allowed to crystallize out completely. 500 parts of moist filter cake is obtained having a content of 58% of the sodium salt of dihydroxyquinoline, equivalent to 289 parts of 100% the sodium salt of 2,4-dihydroxyquinoline.

EXAMPLE 3

400 parts of ethyl anthranilate is caused to react at from 110° to 130° C. with 210 parts of diketene. The reaction product is run as a liquid into an autoclave filled with 4750 parts of water. The whole is heated at 80° to 90° C. and 660 parts of about 50% caustic potash solution is added. The whole is stirred for one hour at 90° C., then heated slowly to 170° C., sitrred for another five hours at this temperature, cooled, diluted with a little water and acidified. The precipitate is suction filtered, washed until neutral and dried. 343 parts of 94% 2,4-dihydroxyquinoline is thus obtained.

EXAMPLE 4

377 parts of methyl anthranilate is allowed to react with 225 parts of diketene at about 120° C. The liquid reaction product is run off while hot into an autoclave containing a suspension of 600 parts of quicklime in 4700 parts of water at 80° C. After stirring for one hour at 90° C., the whole is heated to 180° C., stirred for eight hours at this temperature, cooled to room temperature and the precipitate is suction filtered. The moist filter cake is stirred into hot 5% caustic soda solution and the mixture is filtered. The filtrate is acidified. After suction filtration, washing and drying, 244 parts of 89% 2,4-dihydroxyquinoline is obtained.

EXAMPLE 5

A mixture of 117 parts of methyl acetoacetylanthranilate and 420 parts of methyl diglycol is heated to 85° C. in a stirred flask having a superimposed distillation bridge. 200 parts of about 50% caustic soda solution is then run in slowly at such a rate that the internal temperature does not exceed 95° C. The whole is stirred for ninety minutes at 95° C. and the temperature is then slowly raised to 175° C. so that a mixture of methanol, water and some methyl diglycol distils off. The contents of the flask are stirred for four hours at 175° C., then cooled to about 100° C. and about 300 parts of water is added. The whole is made clearly acid with hydrochloric acid, cooled to room temperature, suction filtered, washed until neutral and dried. 68 parts of 92% 2,4-dihydroxyquinoline is obtained.

We claim:

1. A process in the production of 2,4-dihydroxyquinoline which comprises forming the alkali or alkaline earth metal salt of 3-acetyl-2,4-dihydroxyquinoline by reacting a compound of the formula

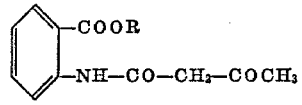

wherein R is alkyl of one to four carbon atoms, with from 1 to 10 equivalents of alkali or alkaline earth metal hydroxide in aqueous solution at a temperature of about 70° C. to 100 C. and deacetylating said alkali or alkaline earth metal salt of 3-acetyl-2,4-dihydroxyquinoline by further reaction in alkaline solution at temperatures raised to about 130° C. to 190° C.

2. A process as claimed in claim 1 wherein said hydroxide is sodium hydroxide.

3. A process as claimed in claim 1 wherein the concentration of the alkaline solution during the deacetylation is maintained at about 1.5 to 5 N.

References Cited

UNITED STATES PATENTS 3,652,571    3/1972    Sturm et al. _____ 260—289 R

FOREIGN PATENTS 1,509,468    2/1968    France.

DONALD G. DAUS, Primary Examiner

U.S. Cl. X.R.

260—289 R